US009480326B2

(12) United States Patent
Stephens et al.

(10) Patent No.: US 9,480,326 B2
(45) Date of Patent: Nov. 1, 2016

(54) HAND-WEARABLE CAMERA HARNESS AND METHOD OF ASSEMBLING THE HAND-WEARABLE CAMERA HARNESS

(71) Applicant: Versa Mount, LLC, Waterford, MI (US)

(72) Inventors: Michael B. Stephens, Waterford, MI (US); Aaron D. Stephens, Waterford, MI (US)

(73) Assignee: Versa Mount LLC, Waterford, MI (US)

( * ) Notice: Subject to any disclaimer, the term of this patent is extended or adjusted under 35 U.S.C. 154(b) by 0 days.

(21) Appl. No.: 14/705,032

(22) Filed: May 6, 2015

(65) Prior Publication Data
US 2015/0323858 A1    Nov. 12, 2015

Related U.S. Application Data

(60) Provisional application No. 61/989,590, filed on May 7, 2014.

(51) Int. Cl.
| | |
|---|---|
| *G03B 17/00* | (2006.01) |
| *A45F 5/00* | (2006.01) |
| *G03B 17/56* | (2006.01) |
| *F16M 13/04* | (2006.01) |
| *F16M 11/10* | (2006.01) |
| *F16M 11/20* | (2006.01) |
| *F16M 13/00* | (2006.01) |

(52) U.S. Cl.
CPC ............... *A45F 5/00* (2013.01); *F16M 11/10* (2013.01); *F16M 11/2014* (2013.01); *F16M 13/00* (2013.01); *F16M 13/04* (2013.01); *G03B 17/56* (2013.01); *G03B 17/561* (2013.01); *A45F 2005/008* (2013.01); *A45F 2200/0533* (2013.01); *Y10T 29/49828* (2015.01)

(58) Field of Classification Search
USPC ......................................................... 396/423
See application file for complete search history.

(56) References Cited

U.S. PATENT DOCUMENTS

| | | | | |
|---|---|---|---|---|
| 5,404,182 | A * | 4/1995 | Nomura | F16M 11/12 248/920 |
| 7,878,465 | B2 * | 2/2011 | Jaumann | F16M 11/04 248/178.1 |
| 8,014,656 | B2 * | 9/2011 | Woodman | B63B 25/002 396/25 |

(Continued)

OTHER PUBLICATIONS

"Cookie Universal Hand Mount" at www.basik.frien/cookie-composites-xml-352_399-1680.html, p. 1, date of retrieval Apr. 22, 2014.

*Primary Examiner* — David Gray
*Assistant Examiner* — Dennis Hancock
(74) *Attorney, Agent, or Firm* — Buckert Patent & Trademark Law Firm, PC; John F. Buckert (57) ABSTRACT

A hand-wearable camera harness is provided. The harness includes a plate member and a first aperture extending therethrough. The plate member has a first surface and a ring-shaped mounting portion fixedly coupled to the first surface. The ring-shaped mounting portion extends outwardly from the first surface and further extends circumferentially around the first aperture. The ring-shaped mounting portion has a top surface with a first plurality of grooves extending therein. The hand-wearable camera harness further includes a rotatable mounting bracket having a substantially circular-shaped base and at least first and second extension portions. The substantially circular-shaped base has a bottom surface with a second plurality of grooves extending therein.

19 Claims, 9 Drawing Sheets

(56) References Cited

U.S. PATENT DOCUMENTS

| | | | | |
|---|---|---|---|---|
| 8,596,892 B2* | 12/2013 | Murrow | ............... | F16M 11/04 248/178.1 |
| 2003/0156836 A1* | 8/2003 | Ward | ............... | F16M 11/04 396/419 |
| 2007/0201861 A1* | 8/2007 | Coulman | ............... | A45F 5/00 396/420 |
| 2012/0288269 A1* | 11/2012 | Jensen | ............... | F16M 11/14 396/428 |
| 2013/0196798 A1* | 8/2013 | Ochs | ............... | A63B 59/00 473/518 |

* cited by examiner

HAND-WEARABLE CAMERA HARNESS AND METHOD OF ASSEMBLING THE HAND-WEARABLE CAMERA HARNESS

CROSS-REFERENCE TO RELATED APPLICATIONS

This application claims priority to U.S. Provisional Patent Application No. 61/989,590 filed on May 7, 2014, the entire contents of which are hereby incorporated by reference herein.

BACKGROUND

The inventors herein have recognized a need for an improved camera harness and an improved method of assembling a camera harness.

SUMMARY

A hand-wearable camera harness in accordance with an exemplary embodiment is provided. The hand-wearable camera harness includes a plate member having a first side and a second side disposed opposite to the first side, and a first aperture extending therethrough. The first aperture is centered about a first axis that extends substantially perpendicular to the first side of the plate member. The first side of the plate member has a first surface and a ring-shaped mounting portion fixedly coupled to the first surface. The ring-shaped mounting portion extends outwardly from the first surface and further extends circumferentially around the first aperture. The ring-shaped mounting portion has a top surface with a first plurality of grooves extending therein. Each groove of the first plurality of grooves extends from an outer portion of the ring-shaped mounting portion toward the first axis. Each groove of the first plurality of grooves is disposed between two other grooves of the first plurality of grooves and spaced apart from the two other grooves of the first plurality of grooves. The hand-wearable camera harness further includes a rotatable mounting bracket having a substantially circular-shaped base and at least first and second extension portions. The substantially circular-shaped base has a first side and a second side, and a second aperture extending therethrough. The second aperture is centered about the first axis. The second side of the substantially circular-shaped base has a bottom surface with a second plurality of grooves extending therein. Each groove of the second plurality of grooves extends from an outer portion of the substantially circular-shaped base toward the first axis. Each groove of the second plurality of grooves is disposed between two other grooves of the second plurality of grooves and is spaced apart from the two other grooves of the second plurality of grooves. The first and second extension portions are fixedly coupled to the substantially circular-shaped base and extend substantially perpendicular to the first side thereof. The first and second extension portions define a first gap therebetween. The second side of the substantially circular-shaped base of the rotatable mounting bracket is disposed on the ring-shaped mounting portion of the plate member. The substantially circular-shaped base is rotatably coupled to the ring-shaped mounting portion utilizing a pin member extending through the first and second apertures.

A method for assembling a hand-wearable camera harness in accordance with another exemplary embodiment is provided. The method includes providing a plate member having a first side and a second side disposed opposite to the first side, and a first aperture extending therethrough. The first aperture is centered about a first axis extending substantially perpendicular to the first side of the plate member. The first side of the plate member has a first surface and a ring-shaped mounting portion fixedly coupled to the first surface. The ring-shaped mounting portion extends outwardly from the first surface and further extends circumferentially around the first aperture. The ring-shaped mounting portion has a top surface with a first plurality of grooves extending therein. Each groove of the first plurality of grooves extends from an outer portion of the ring-shaped mounting portion toward the first axis. Each groove of the first plurality of grooves is disposed between two other grooves of the first plurality of grooves and spaced apart from the two other grooves of the first plurality of grooves. The method further includes providing a rotatable mounting bracket having a substantially circular-shaped base and at least first and second extension portions. The substantially circular-shaped base has a first side and a second side, and a second aperture extending therethrough. The second aperture is centered about the first axis. The second side of the substantially circular-shaped base has a bottom surface with a second plurality of grooves extending therein. Each groove of the second plurality of grooves extends from an outer portion of the substantially circular-shaped base toward the first axis. Each groove of the second plurality of grooves is disposed between two other grooves of the second plurality of grooves and spaced apart from the two other grooves of the second plurality of grooves. The first and second extension portions are fixedly coupled to the substantially circular-shaped base and extend substantially perpendicular to the first side thereof. The first and second extension portions define a first gap therebetween. The first and second extension portions have first and second extension portion apertures, respectively, extending therethrough. The method further includes disposing the second side of the substantially circular-shaped base of the rotatable mounting bracket on the ring-shaped mounting portion of the plate member. The method further includes disposing the pin member through the first and second apertures such that the substantially circular-shaped base is rotatably coupled to the ring-shaped mounting portion.

DETAILED DESCRIPTION

Referring to FIGS. 1-6, a camera system 10 which can be removably coupled to a human hand 12 is illustrated. The camera system 10 includes a camera case 30, and a hand-wearable camera harness 32 in accordance with an exemplary embodiment. An advantage of the hand-wearable camera harness 32 is that the harness 32 utilizes a plate member 60 with a ring-shaped mounting portion 132 (shown in FIG. 7) having a first plurality of grooves 142 thereon, that is rotatably coupled to a rotatable mounting bracket 62 having a second plurality of grooves 202 (shown in FIG. 16) disposed thereon. The rotatable mounting bracket 62 can be rotated 360° about a first axis 100 (shown in FIG. 13) relative to the plate member 60 and can be stopped and maintained at a plurality predetermined angular positions relative to the plate member 60 utilizing the grooves 142, 202.

The camera case 30 includes a housing 40 and extension portions 42, 44. The extension portions 42, 44 extend from a bottom surface of the housing 40 and are disposed substantially parallel to one another a predetermined distance apart from one another. In an exemplary embodiment, the camera case 30 is constructed of plastic.

Figure 1:
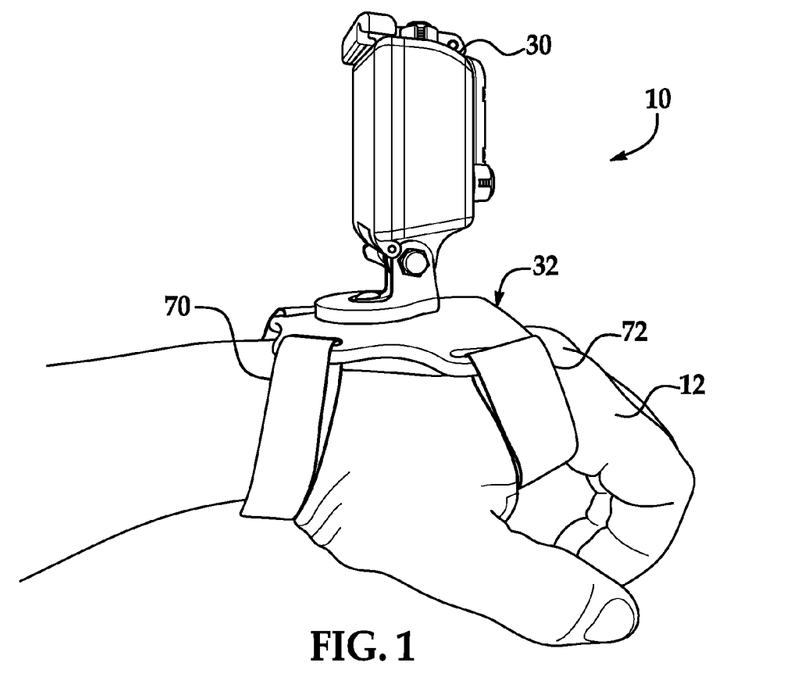
FIG. 1 is a schematic of a camera system coupled to a human hand.
Figure 2:
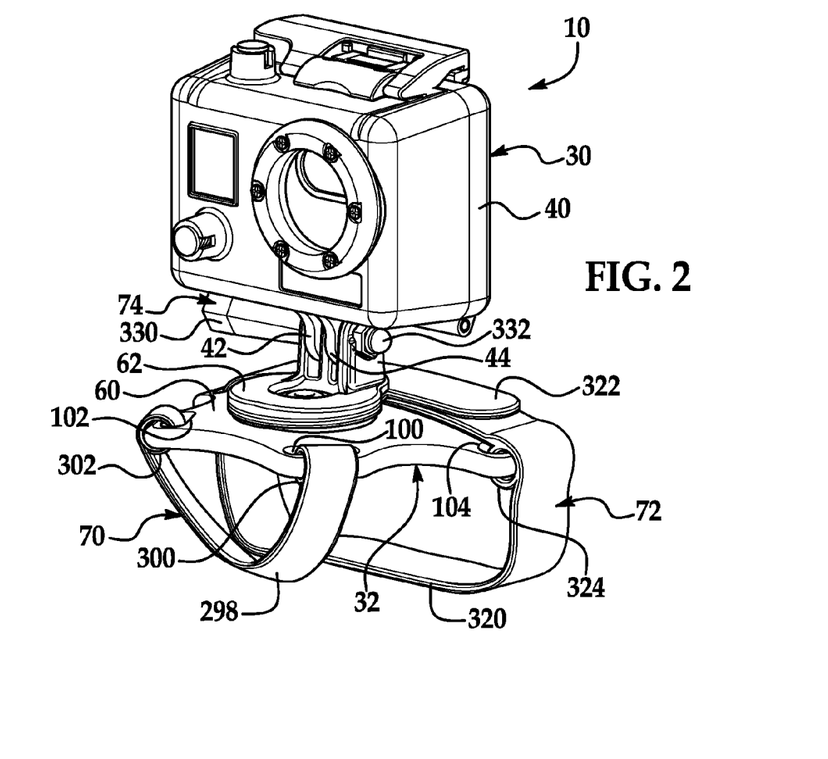
FIG. 2 is an isometric view of the camera system of FIG. 1.
Figure 3:
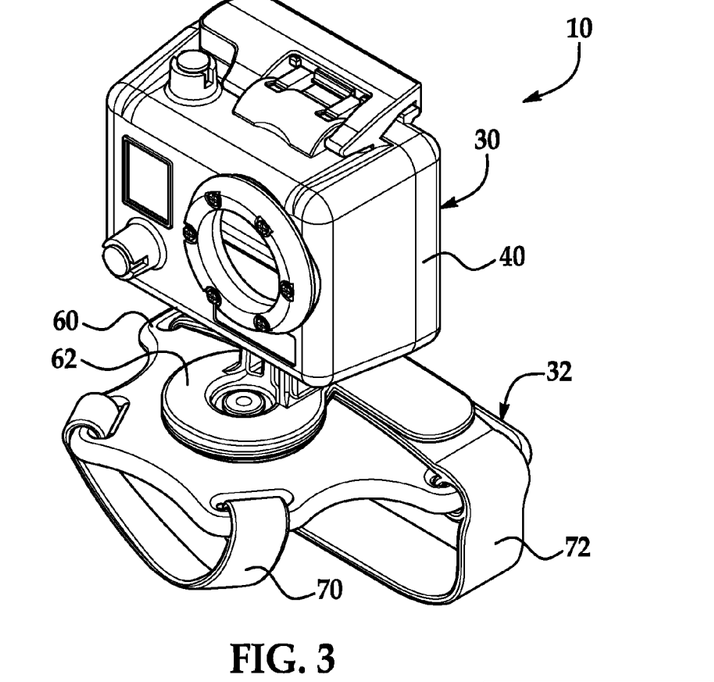
FIG. 3 is another isometric view of the camera system of FIG. 1.
Figure 4:
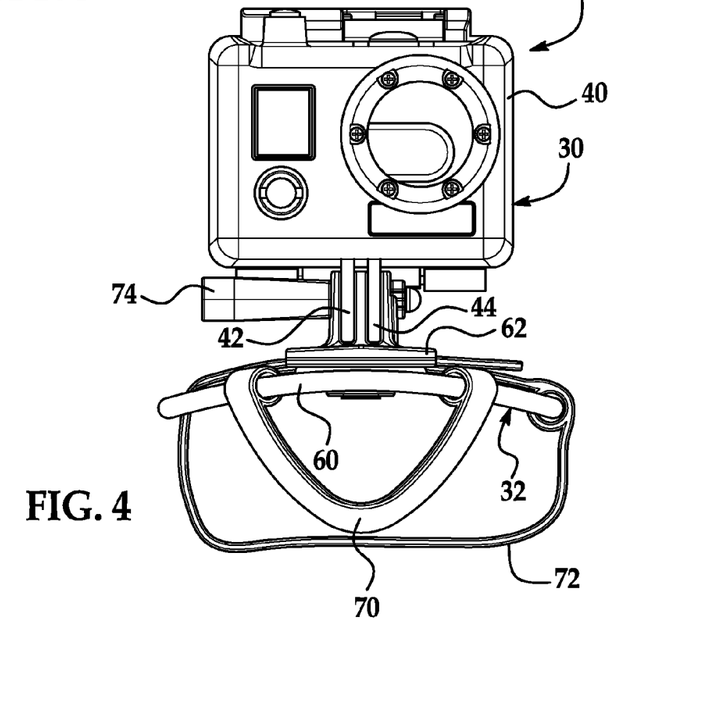
FIG. 4 is a front view of the camera system of FIG. 1.
Figure 5:
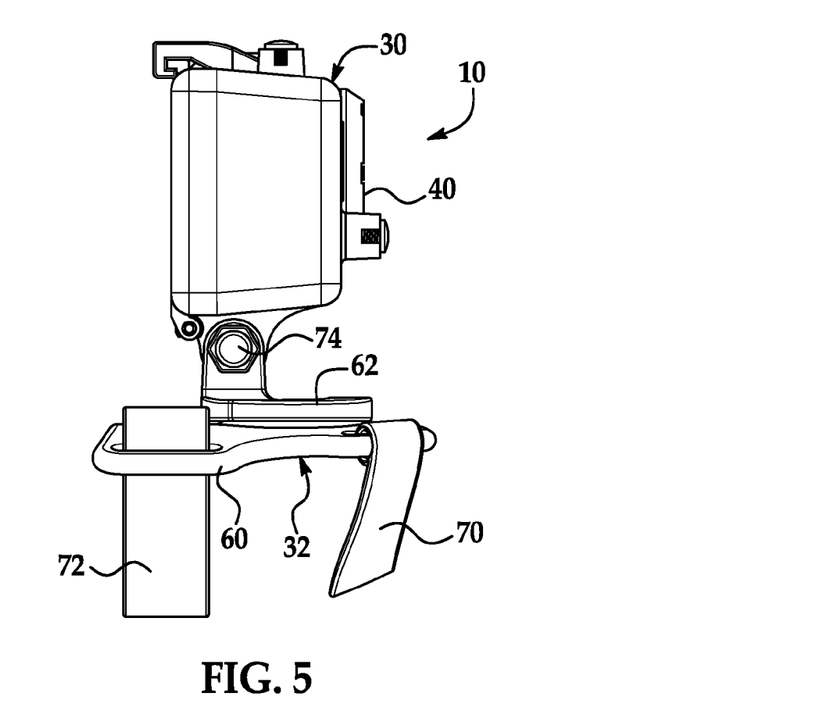
FIG. 5 is a side view of the camera system of FIG. 1.
Figure 6:
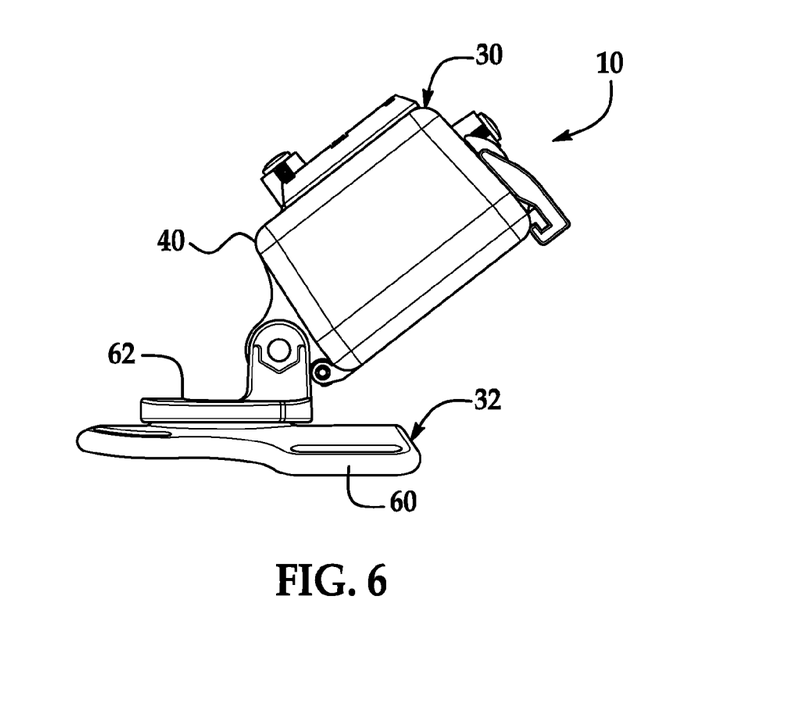
FIG. 6 is a side view of a portion of the camera system of FIG. 1.
Figure 7:
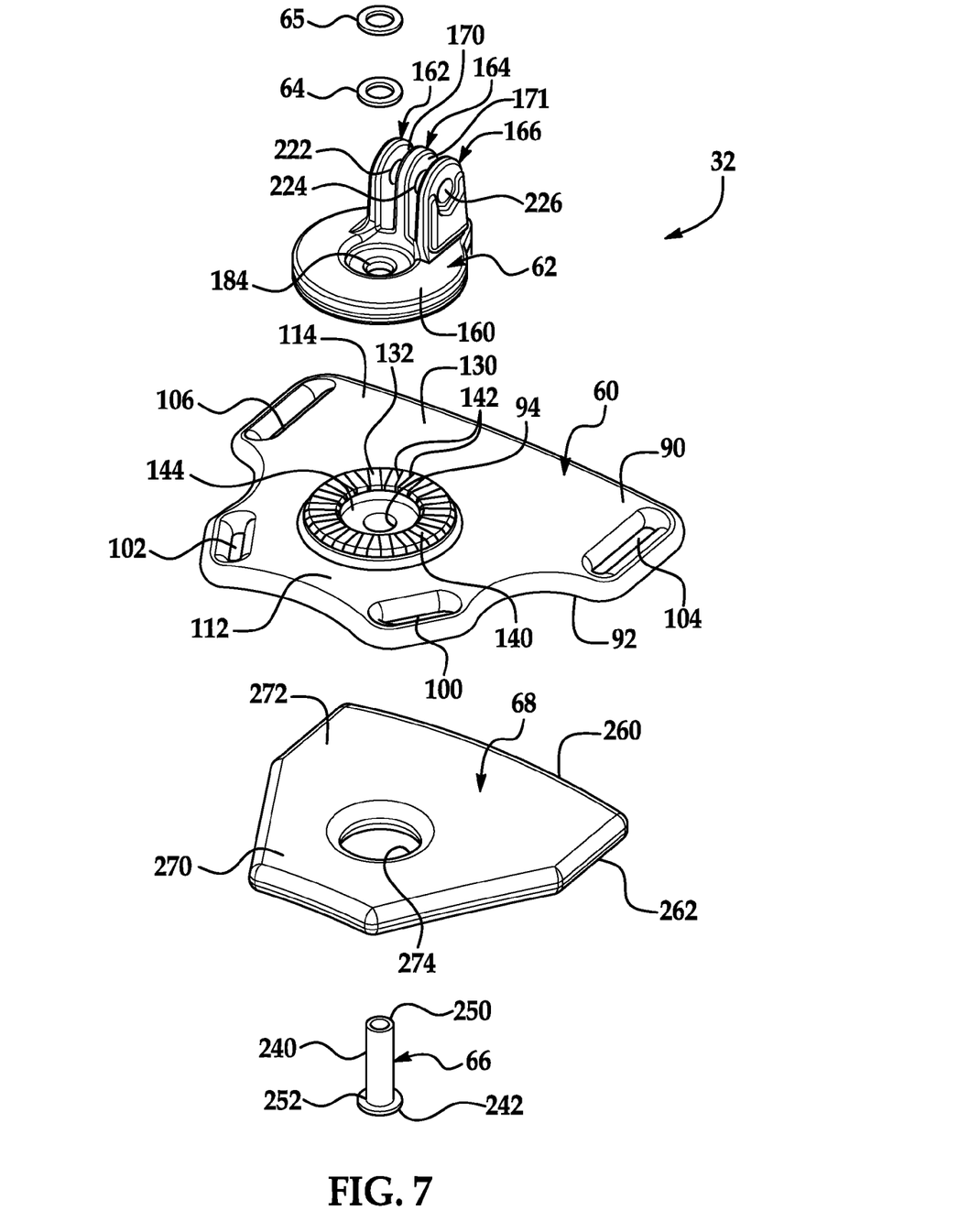
FIG. 7 is an exploded schematic of a hand-wearable camera harness utilized in the camera system of FIG. 1.

Referring to FIGS. 2 and 7, the hand-wearable camera harness 32 in accordance with an exemplary embodiment is configured to be operably coupled to the camera case 30. The hand-wearable camera harness 32 includes a plate member 60, a rotatable mounting bracket 62, a washer 64, a washer 65, a pin member 66, a cushion member 68, straps 70, 72, and a coupling member 74.

Figures 8, 9, 10, 11:
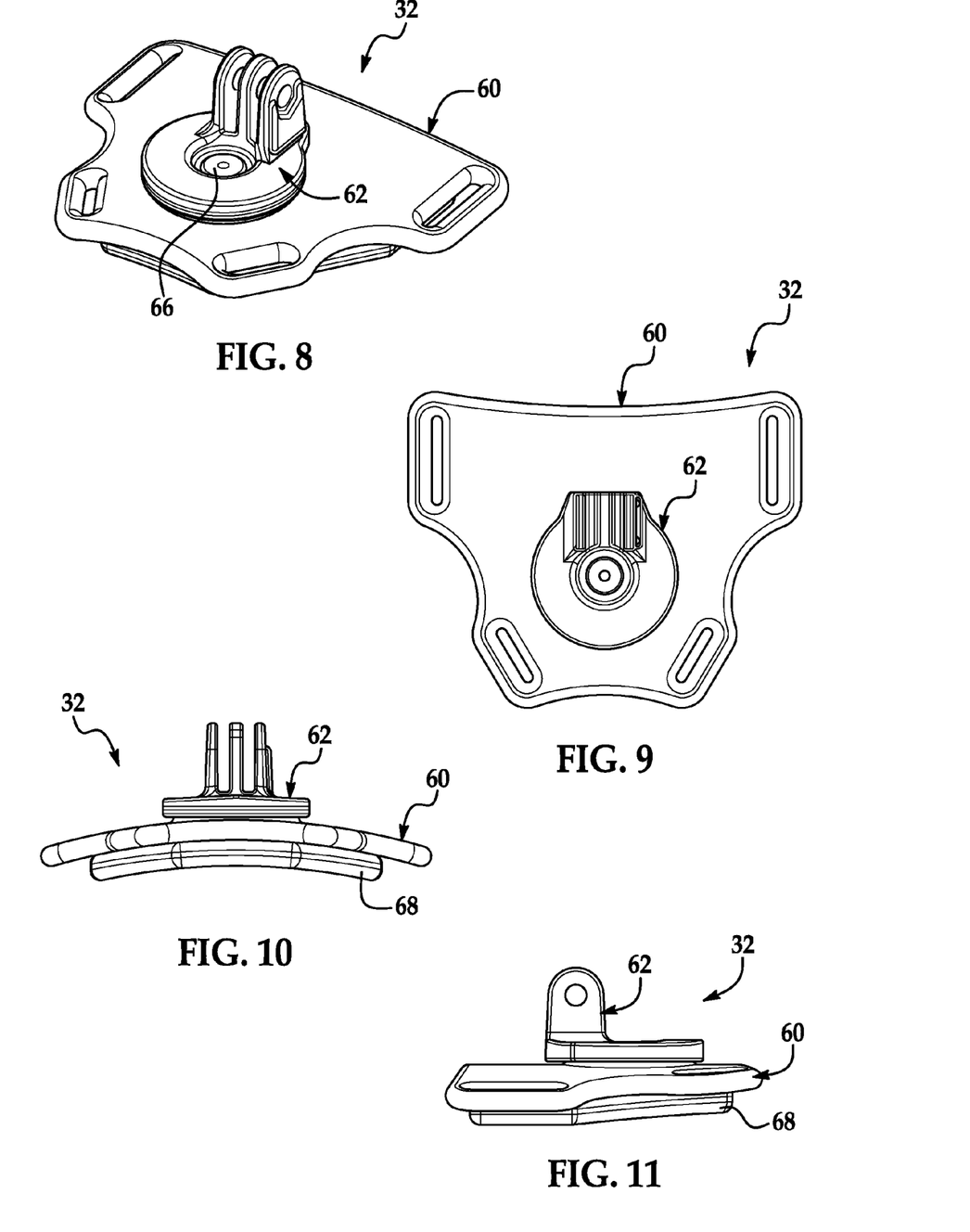
FIG. 8 is an isometric view of the hand-wearable camera harness of FIG. 7.
FIG. 9 is a top view of the hand-wearable camera harness of FIG. 8.
FIG. 10 is a front view of the hand-wearable camera harness of FIG. 8.
FIG. 11 is a side view of the hand-wearable camera harness of FIG. 8.
Figure 12:
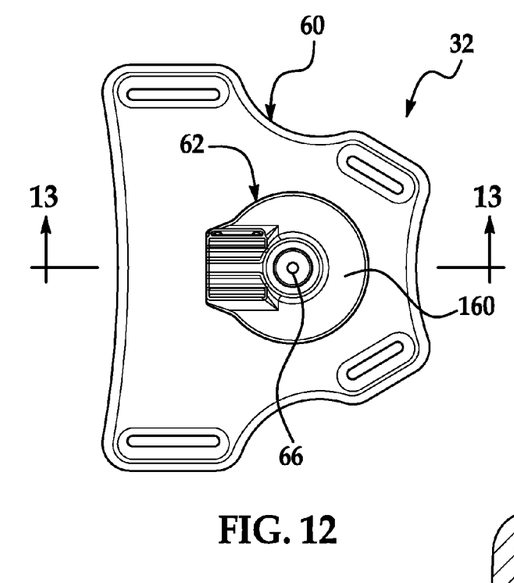
FIG. 12 is a top view of the hand-wearable camera harness of FIG. 8.
Figure 13:
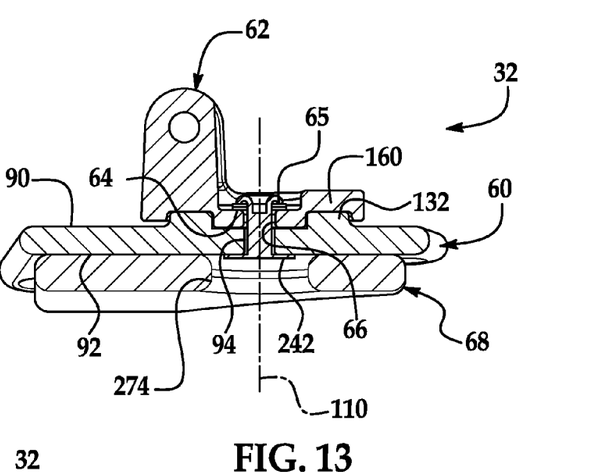
FIG. 13 is a cross-sectional view of the hand-wearable camera harness of FIG. 12 taken along lines 13-13.
Figure 14:
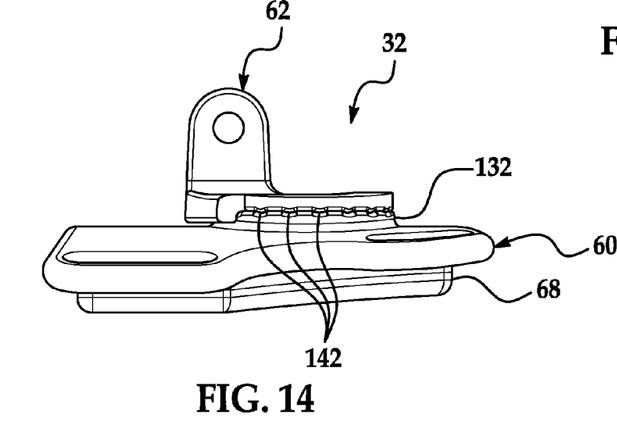
FIG. 14 is an enlarged side view of a portion of the hand-wearable camera harness of FIG. 8 in which a portion of a rotatable mounting bracket has been removed to illustrate corresponding grooves of a rotating mounting bracket and a plate member.
Figure 15:
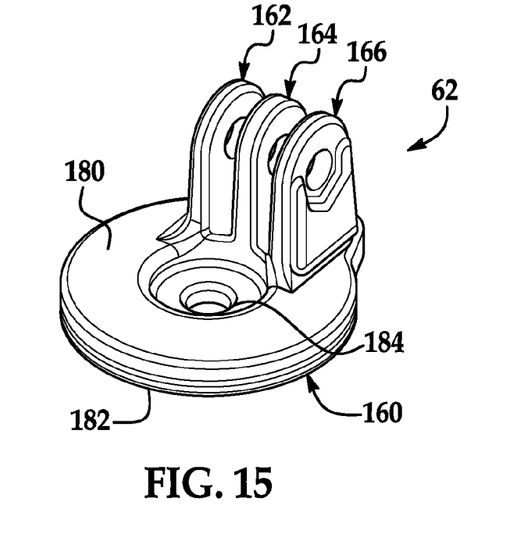
FIG. 15 is an isometric view of a rotatable mounting bracket utilized in the hand-wearable camera harness of FIG. 8.

Referring to FIGS. 7, 10, and 13, the plate member 60 has a first side 90, a second side 92 disposed opposite to the first side 90, an aperture 94 extending therethrough, and elongated apertures 100, 102, 104, 106 extending therethrough. The plate member 60 further includes a first end 112 and a second end 114. The elongated apertures 100, 102 are disposed proximate to the first end 112. Further, the elongated apertures 104, 106 are disposed proximate to the second end 114. The aperture 94 is centered about a first axis 110 extending substantially perpendicular to the first side 90 of the plate member 60. In an exemplary embodiment, the plate member 60 is a substantially arcuate-shaped plate member. Further, the plate member 60 is constructed of plastic. In an alternative embodiment, the plate member 60 could be constructed of another material such as stainless steel or a ceramic for example.

The first side 90 of the plate member 60 has a first surface 130 and a ring-shaped mounting portion 132 fixedly coupled to the first surface 130. The ring-shaped mounting portion 132 extends outwardly from the first surface 130 and further extends circumferentially around the aperture 94. The ring-shaped mounting portion 132 has a top surface 140 with a first plurality of grooves 142 extending therein. The ring-shaped mounting portion 132 further defines a cylindrical-shaped space 144 communicating with the aperture 94. Each groove of the first plurality of grooves 142 extends from an outer portion of the ring-shaped mounting portion 132 toward the first axis 110. Each groove of the first plurality of grooves 142 is disposed between two other grooves of the first plurality of grooves 142 and is spaced apart from the two other grooves of the first plurality of grooves 142. Further, the first plurality of grooves 142 extend from an inner edge of the ring-shaped mounting portion 132 defined by the space 144 to an outer edge of the portion 132, and extend radially outwardly from the first axis 110. In an exemplary embodiment, each groove of the first plurality of grooves 142 has a substantially arcuate-shaped cross-sectional shape.

Referring to FIGS. 7 and 15-17, the rotatable mounting bracket 62 is adapted to be rotatably coupled to the plate member 60. The rotatable mounting bracket 62 includes a substantially circular-shaped base 160 and first, second, and third extension portions 162, 164, 166.

The substantially circular-shaped base 160 has a first side 180 and a second side 182, and an aperture 184 extending therethrough. The aperture 184 is centered about the first axis 110 and communicates with the aperture 94 in the plate member 60.

The second side 182 has a bottom surface 200 with a second plurality of grooves 202 extending therein. The second side 182 further includes a cylindrical-shaped extension portion 204 centered about the first axis 110 and having the aperture 184 extending therethrough. The second side 182 further includes a peripheral ring portion 206 extending outwardly from the bottom surface 200 of the substantially circular-shaped base 160 of the rotatable mounting bracket 62. Each groove of the second plurality of grooves 202 are disposed between the peripheral ring portion 206 and the cylindrical-shaped extension portion 204 and further extend radially outwardly from the first axis 110. Each groove of the second plurality of grooves 202 is disposed between two other grooves of the second plurality of grooves 202 and spaced apart from the two other grooves of the second plurality of grooves 202. In an exemplary embodiment, each groove of the second plurality of grooves 202 has a substantially arcuate-shaped cross-sectional shape. The cylindrical-shaped extension portion 204 extends outwardly from the bottom surface 200 of the substantially circular-shaped base 160 of the rotatable mounting bracket 62. The cylindrical-shaped extension portion 204 is disposed in the cylindrical-shaped space 144 of the plate member 60.

Figure 16:
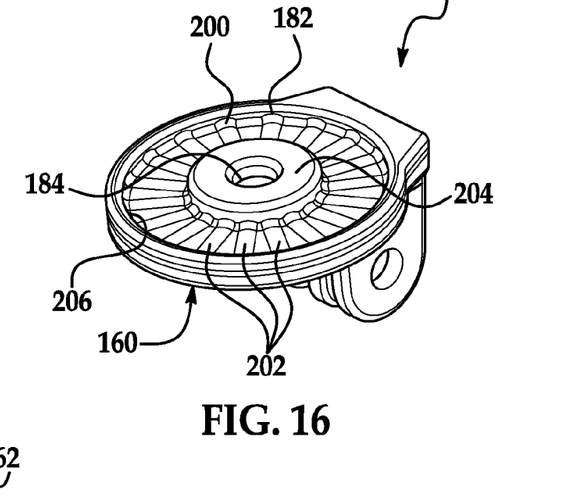
FIG. 16 is another isometric view of the rotatable mounting bracket of FIG. 15.
Figure 17:
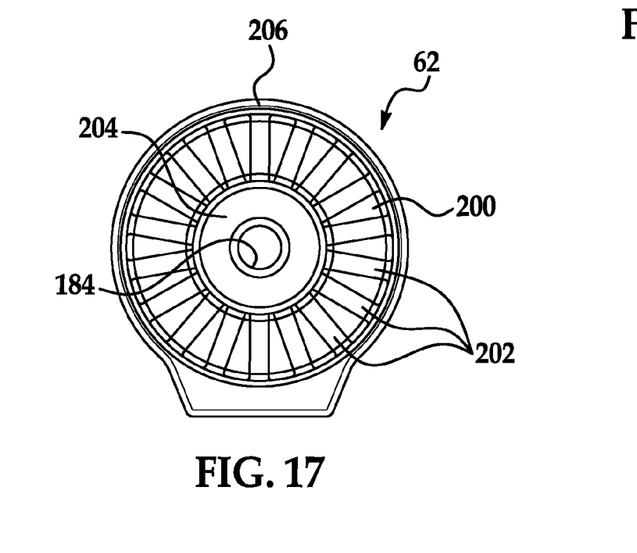
FIG. 17 is a bottom view of the rotatable mounting bracket of FIG. 15.

Referring to FIGS. 7 and 16, the second side 182 is disposed on the ring-shaped mounting portion 132 of the plate member 60. The substantially circular-shaped base 160 is rotatably coupled to the ring-shaped mounting portion 132 utilizing the pin member 66 which extends through the apertures 94, 184. Further, an outer diameter of the substantially circular-shaped base 160 is greater than an outer diameter of the ring-shaped mounting portion 132.

Referring to FIGS. 2 and 7, the first, second, and third extension portions 162, 164, 166 are fixedly coupled to the substantially circular-shaped base 160 and extend substantially perpendicular to the first side 180 thereof. The first and second extension portions 162, 164 define a first gap 170 therebetween for receiving the extension portion 42 of the camera case 30 therein. The second and third extension portions 164, 166 define a second gap 171 therebetween for receiving the extension portion 44 of the camera case 30 therein. The first, second, and third extension portions 162, 164, 166 include first, second, and third extension portion apertures 222, 224, 226, respectively, extending therethrough. The first, second, and third extension portion apertures 222, 224, 226 are configured to receive a portion of the coupling member 74 therethrough for rotatably coupling the camera housing 40 to the first, second, and third extension portions 162, 164, 166.

Referring to FIGS. 7 and 13, the pin member 66 includes a tubular portion 240 and a flange portion 242. The tubular portion 240 includes a first end 250 and a second end 252. The second end 252 is coupled to the flange portion 242. The tubular portion 240 is disposed through an aperture 274 in the cushion member 68 and further through the apertures 94, 184 such that the flange portion 242 contacts the second side 92 of the plate member 60. The first end 250 of the tubular portion 240 is disposed through the washers 64, 65 and the washers 64, 65 are disposed proximate to the first end 250 of the tubular portion 240. The first end 250 is bent downwardly (shown in FIG. 13) to contact the washer 65 such that the washer 65 further contacts and is disposed on the washer 64. The washer 64 is further disposed on portion of the first side 180 of the substantially circular-shaped base 160. In an exemplary embodiment, the pin member 66 is constructed of steel. Of course, in an alternative embodiment, the pin member 66 could be constructed of other materials such as copper for example. Further, in an exemplary embodiment, the washer 65 is constructed of steel, and the washer 64 is constructed of an elastomeric material such as a rubber compound. An advantage of the washer 64 is that the washer 64 allows the rotatable mounting member 62 to move vertically along the axis 110 a relatively small amount when the member 62 is rotated relative to the plate member 62. The washer 64 further biases the rotatable mounting member 62 toward the plate member 62.

Referring to FIGS. 7-14, the cushion member 68 includes a first side 260 and a second side 262 disposed opposite to the first side 260. The cushion member 68 further includes a first end 270 and a second end 272. The cushion member 68 includes an aperture 274 extending therethrough. The first side 260 is adapted to be coupled to the second side 92 of the plate member 60 such that the aperture 274 is centered about the first axis 110.

Referring to FIGS. 1-5, the first and second straps 70, 72 are coupled to the plate member 60 and are provided to allow the hand-wearable camera harness 32 to be removably coupled to the human hand 12.

The first strap 70 has a central strap portion 298 and ringlet portions 300, 302 that are coupled to first and second ends, respectively, of the central strap portion 298. The ringlet portion 300 encircles a first portion of the plate member 60 that is disposed between an outer edge of the plate member 60 and the elongated aperture 100. The ringlet portion 302 encircles a second portion of the plate member 60 that is disposed between the outer edge of the plate member 60 and the second elongated aperture 102. In an exemplary embodiment, the first strap 70 is a Velcro strap which can be removably adhered to itself.

The second strap 72 has elongated strap portions 320, 322 and a ringlet portion 324. The ringlet portion 324 is disposed between and coupled to the elongated strap portions 320, 322. The ringlet portion 324 encircles a third portion of the plate member 60 that is disposed between the outer edge of the plate member 60 and the third elongated aperture 104. The elongated strap portion 322 further extends through the fourth elongated aperture 106. The elongated strap portion 322 is adapted to removably engage the elongated strap portion 320. In an exemplary embodiment, the second strap 72 is a Velcro strap which can be removably adhered to itself.

Referring to FIGS. 2 and 7, the coupling member 74 is provided to couple the camera case 30 to the hand-wearable camera harness 32. The coupling member 74 includes a shaft 330 and a nut 332. A threaded portion of the shaft 330 extends through the first extension portion aperture 222, an aperture extending through the extension portion 42, the second extension portion aperture 224, an aperture extending through the extension portion 44, and the third extension portion aperture 226, and is threadably coupled to the nut 332. The shaft 330 can be loosened from the nut 332 to adjust a rotational position of the camera housing 40 relative to the harness 32. Further, the shaft 330 can be tightened within the nut 332 to hold the rotational position of the camera housing 40 relative to the harness 32.

Referring to FIGS. 3, 7, 13, and 18-19, a flowchart of a method for assembling the hand-wearable camera harness 32 in accordance with another exemplary embodiment will now be described.

Figure 18:
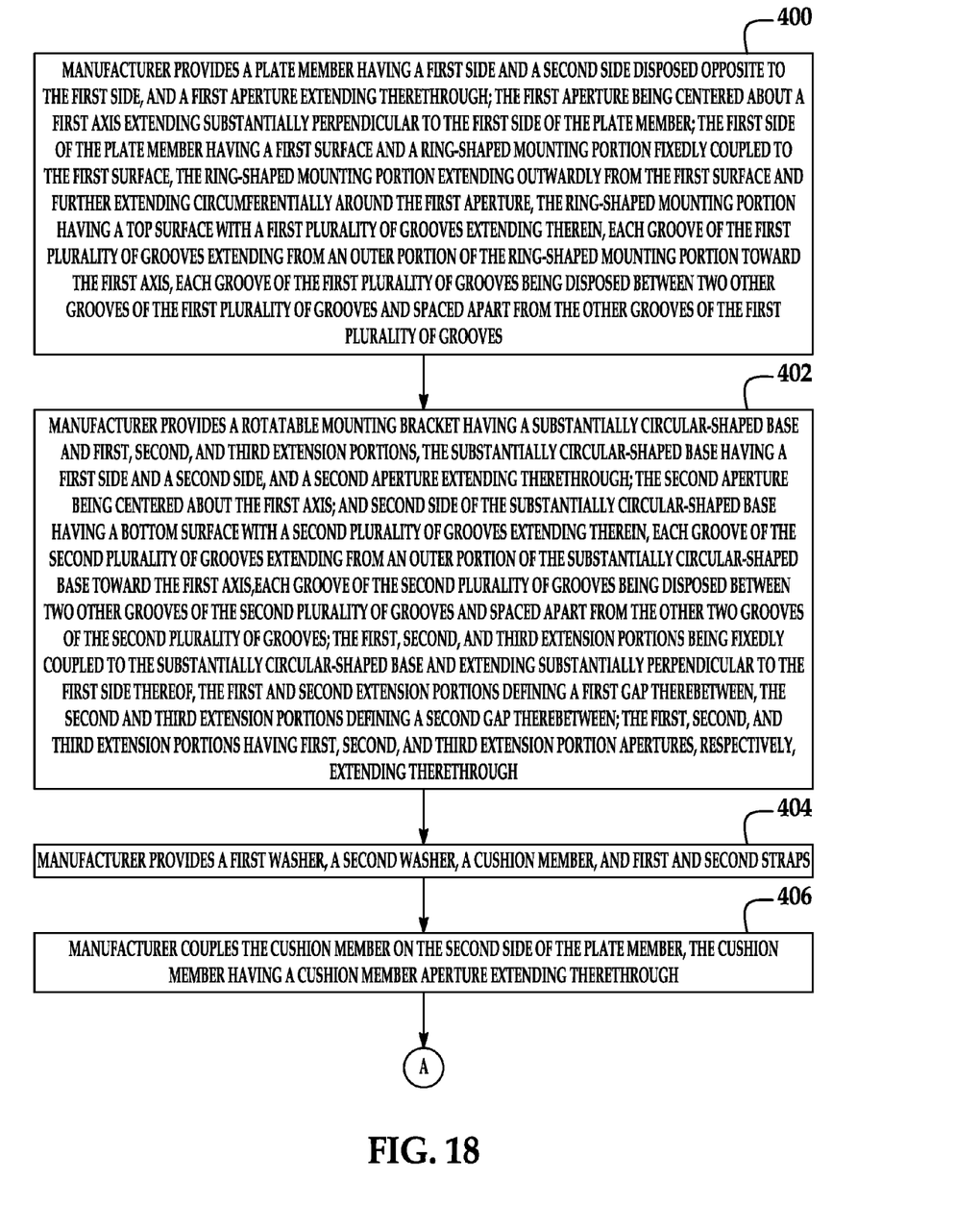
FIGS. 18-19 are flowcharts of a method of assembling the hand-wearable camera harness of FIG. 8 in accordance with another exemplary embodiment.

At step 400, the manufacturer provides the plate member 60 having the first side 90 and the second side 92 disposed opposite to the first side 90, and the aperture 94 extending therethrough. The aperture 94 is centered about the first axis 110 extending substantially perpendicular to the first side 90 of the plate member 60. The first side 90 of the plate member 60 has the first surface 130 and the ring-shaped mounting portion 132 fixedly coupled to the first surface 130. The ring-shaped mounting portion 132 extends outwardly from the first surface 130 and further extends circumferentially around the aperture 94. The ring-shaped mounting portion 132 has the top surface 140 with the first plurality of grooves 142 extending therein. Each groove of the first plurality of grooves 142 extends from an outer portion of the ring-shaped mounting portion 132 toward the first axis 110. Each groove of the first plurality of grooves 142 is disposed between two other grooves of the first plurality of grooves 142 and spaced apart from the two other grooves of the first plurality of grooves 142. After step 400, the method advances to step 402.

At step 402, the manufacturer provides the rotatable mounting bracket 62 having a substantially circular-shaped base 160 and first, second, and third extension portions 162, 164, 166. The substantially circular-shaped base 160 having the first side 180 and the second side 182, and the aperture 184 extending therethrough. The aperture 184 is centered about the first axis 110. The second side 182 of the substantially circular-shaped base 160 has the bottom surface 200 with the second plurality of grooves 202 extending therein. Each groove of the second plurality of grooves 202 extends from an outer portion of the substantially circular-shaped base 160 toward the first axis 110. Each groove of the second plurality of grooves 202 is disposed between two other grooves of the second plurality of grooves 202 and spaced apart from the two other grooves of the second plurality of grooves 202. The first, second, and third extension portions 162, 164, 166 are fixedly coupled to the substantially circular-shaped base 160 and extend substantially perpendicular to the first side 90 thereof. The first and second extension portions 162, 164 define a first gap 170 therebetween. The second and third extension portions 164, 166 define a second gap 171 therebetween. The first, second, and third extension portions 162, 164, 166 have first, second, and third extension portion apertures 222, 224, 226, respectively, extending therethrough. After step 402, the method advances to step 404.

At step 404, the manufacturer provides a washer 64, a washer 65, a cushion member 68, and straps 70, 72. After step 404, the method advances to step 406.

At step 406, the manufacturer couples the cushion member 68 on the second side 92 of the plate member 60. The cushion member 68 has the cushion member aperture 274 extending therethrough. After step 406, the method advances to step 408.

At step 408, the manufacturer disposes the second side 182 of the substantially circular-shaped base 160 of the rotatable mounting bracket 62 on the ring-shaped mounting portion 132 of the plate member 60. After step 408, the method advances to step 410.

Figure 19:
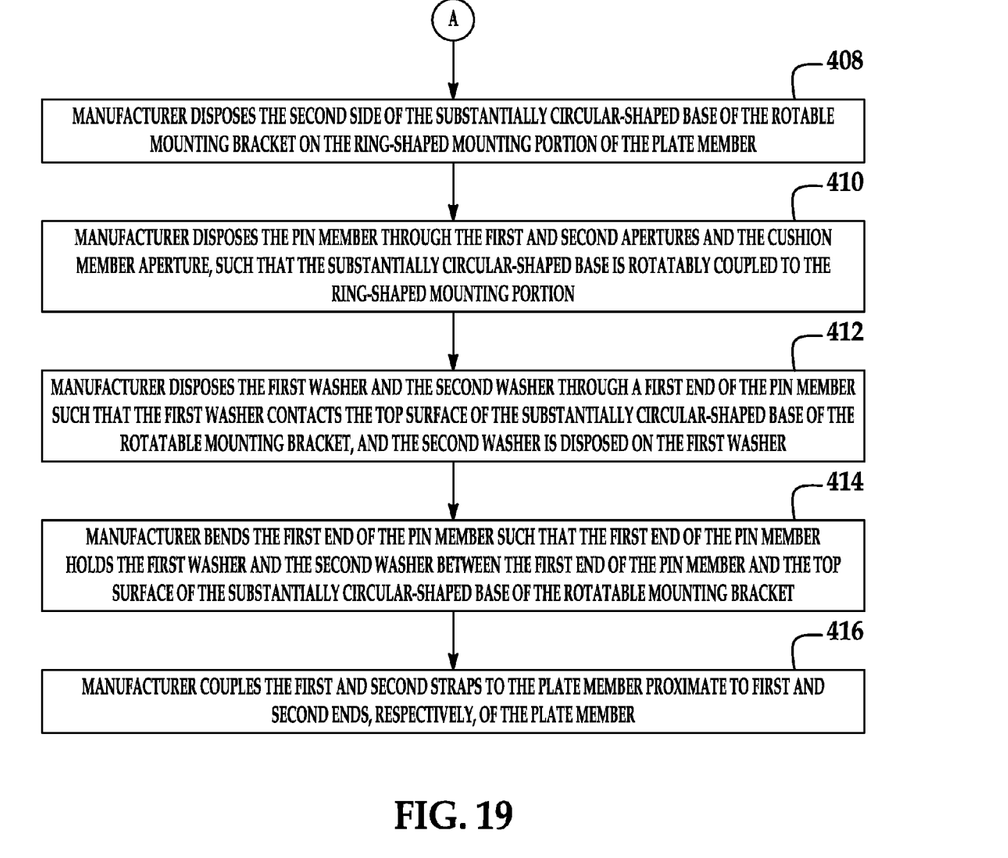

At step 410, the manufacturer disposes the pin member 66 through the apertures 94, 184 and the cushion member aperture 274, such that the substantially circular-shaped base 160 is rotatably coupled to the ring-shaped mounting portion 132. After step 410, the method advances to step 412.

At step 412, the manufacturer disposes the washer 64 and the washer 65 through the end 250 of the pin member 66 such that the washer 64 contacts the top surface 140 of the substantially circular-shaped base 160 of the rotatable mounting bracket 62, and the washer 65 is disposed on the washer 64. After step 412, the method advances to step 414.

At step 414, the manufacturer bends the end 250 of the pin member 66 such that the end 250 of the pin member 66 holds the washer 64 and the washer 65 between the end 250 of the pin member 66 and the top surface 140 of the substantially circular-shaped base 160 of the rotatable mounting bracket 62. After step 414, the method advances to step 416.

At step 416, the manufacturer couples the straps 70, 72 to the plate member 60 proximate to first and second ends 112, 114, respectively, of the plate member 60.

The hand-wearable camera harness and the method of assembling the hand-wearable camera harness provide a substantial advantage over other harnesses and methods. In particular, the hand-wearable camera harness utilizes a plate member with a ring-shaped mounting portion having a first plurality of grooves thereon, wherein a rotatable mounting bracket having a second plurality of grooves is rotatably coupled to ring-shaped mounting portion. The rotatable mounting bracket can be rotated 360° relative to the plate member and can be stopped and maintained at a plurality predetermined angular positions relative to the plate member utilizing the first and second plurality of grooves.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A hand-wearable camera harness, comprising:
a plate member having a first side and a second side disposed opposite to the first side, and a first aperture extending therethrough; the first aperture being centered about a first axis extending substantially perpendicular to the first side of the plate member; the first side of the plate member having a first surface and a ring-shaped mounting portion fixedly coupled to the first surface, the ring-shaped mounting portion extending outwardly from the first surface and further extending circumferentially around the first aperture;
a rotatable mounting bracket having a substantially circular-shaped base and at least first, second, and third extension portions, the substantially circular-shaped base having a first side and a second side, the second side of the substantially circular-shaped base having a bottom surface, a peripheral ring portion, and an inner ring portion; the peripheral ring portion extending outwardly from the bottom surface a first distance in a direction parallel to the first axis, the inner ring portion extending outwardly from the bottom surface a second distance in the direction parallel to the first axis, the second distance being greater than the first distance, the inner ring portion having an outer diameter smaller than an outer diameter of the peripheral ring portion, the rotatable mounting bracket further having a second aperture that is a circular-shaped aperture and extending through the substantially circular-shaped base from the first side of the substantially circular-shaped base to the second side of the substantially circular-shaped base, the second aperture being centered within an inner region defined by the inner ring portion and within another inner region defined by the peripheral ring portion and being centered about the first axis; the first, second, and third extension portions being fixedly coupled to the substantially circular-shaped base and extending substantially perpendicular to the first side thereof, such that a first plane extending through the first axis bisects the second extension portion and the second aperture, and the second extension portion being disposed a first distance away from a periphery of the second aperture in the first plane; the first and second extension portions defining a first gap therebetween, the second and third extension portions defining a second gap therebetween;
the second side of the substantially circular-shaped base of the rotatable mounting bracket being disposed on the ring-shaped mounting portion of the plate member, the substantially circular-shaped base being rotatably coupled to the ring-shaped mounting portion utilizing a first member extending through the first and second apertures; and
the first member comprises a pin member, the pin member includes a tubular portion and a flange portion coupled to an end of the tubular portion; the tubular portion being disposed through the first and second apertures such that the flange portion contacts the second side of the plate member, and another end of the tubular portion being bent downwardly toward the first side of the substantially circular-shaped base.

2. The hand-wearable camera harness of claim 1, wherein the first, second, and third extension portions include first, second, and third extension portion apertures, respectively, extending therethrough; the first, second, and third extension portion apertures being configured to receive a coupling member therethrough for coupling a camera housing to the first, second, and third extension portions.

3. The hand-wearable camera harness of claim 1, wherein the ring-shaped mounting portion has a top surface with a first plurality of grooves extending therein, each groove of the first plurality of grooves extending from an outer portion of the ring-shaped mounting portion toward the first axis, each groove of the first plurality of grooves being disposed between two other grooves of the first plurality of grooves and spaced apart from the two other grooves of the first plurality of grooves; and the second side of the substantially circular-shaped base having a bottom surface with a second plurality of grooves extending therein, each groove of the second plurality of grooves extending from an outer portion of the substantially circular-shaped base toward the first axis, each groove of the second plurality of grooves being disposed between two other grooves of the second plurality of grooves and spaced apart from the two other grooves of the second plurality of groove.

4. The hand-wearable camera harness of claim 3, wherein:

the ring-shaped mounting portion of the plate member defines a cylindrical-shaped space communicating with the first aperture; and the inner ring portion of the rotatable mounting bracket being disposed in the cylindrical-shaped space of the plate member.

5. The hand-wearable camera harness of claim 4, wherein the second plurality of grooves being disposed between the peripheral ring portion and the inner ring portion.

6. The hand-wearable camera harness of claim 3, wherein each groove of the first plurality of grooves has a substantially arcuate-shaped cross-sectional shape.

7. The hand-wearable camera harness of claim 1, further comprising first and second straps coupled to the plate member.

8. The hand-wearable camera harness of claim 1, wherein the plate member includes first, second, third, and fourth elongated apertures extending therethrough; the first and second elongated apertures being disposed proximate to a first end of the plate member; the third and fourth elongated apertures being disposed proximate to a second end of the plate member.

9. The hand-wearable camera harness of claim 8, further comprising a first strap having a central strap portion and first and second ringlet portions being coupled to first and second ends, respectively, of the central strap portion;

the first ringlet portion encircling a first portion of the plate member that is disposed between an outer edge of the plate member and the first elongated aperture; and the second ringlet portion encircling a second portion of the plate member that is disposed between the outer edge of the plate member and the second elongated aperture.

10. The hand-wearable camera harness of claim 9, further comprising a second strap having first and second elongated strap portions and a third ringlet portion, the third ringlet portion being disposed between and coupled to the first and second elongated strap portions;

the third ringlet portion encircling a third portion of the plate member that is disposed between the outer edge of the plate member and the third elongated aperture; and the first elongated strap portion further extending through the fourth elongated aperture, the first elongated strap portion being adapted to removably engage the second elongated strap portion.

11. The hand-wearable camera harness of claim 1, wherein an outer diameter of the substantially circular-shaped base of the rotatable mounting bracket is greater than an outer diameter of the ring-shaped mounting portion of the plate member.

12. The hand-wearable camera harness of claim 1, further comprising a cushion member having a third aperture extending therethrough, the cushion member being attached to the second side of the plate member such that the third aperture is centered about the first axis.

13. The hand-wearable camera harness of claim 1, wherein the rotatable mounting bracket is adapted to rotate 360 degrees on the first axis relative to the plate member.

14. The hand-wearable camera harness of claim 1, wherein the another end of the tubular portion being bent downwardly to contact a first washer being disposed on a second washer wherein the second washer is further disposed on a portion of the first side of the substantially circular-shaped base.

15. A method for assembling a hand-wearable camera harness, comprising:

providing a plate member having a first side and a second side disposed opposite to the first side, and a first aperture extending therethrough; the first aperture being centered about a first axis extending substantially perpendicular to the first side of the plate member; the first side of the plate member having a first surface and a ring-shaped mounting portion fixedly coupled to the first surface, the ring-shaped mounting portion extending outwardly from the first surface and further extending circumferentially around the first aperture;

providing a rotatable mounting bracket having a substantially circular-shaped base and at least first, second, and third extension portions, the substantially circular-shaped base having a first side and a second side; the second side of the substantially circular-shaped base having a bottom surface, a peripheral ring portion, and an inner ring portion; the peripheral ring portion extending outwardly from the bottom surface a first distance in a direction parallel to the first axis, the inner ring portion extending outwardly from the bottom surface a second distance in the direction parallel to the first axis, the second distance being greater than the first distance, the inner ring portion having an outer diameter smaller than an outer diameter of the peripheral ring portion, the rotatable mounting bracket further having a second aperture that is a circular-shaped aperture and extending through the substantially circular-shaped base from the first side of the substantially circular-shaped base to the second side of the substantially circular-shaped base; the second aperture being centered within an inner region defined by the peripheral ring portion and being centered about the first axis; the first, second, and third extension portions being fixedly coupled to the substantially circular-shaped base and extending substantially perpendicular to the first side thereof, such that a first plane extending through the first axis bisects the second extension portion and the second aperture, and the second extension portion being disposed a first distance away from a periphery of the second aperture in the first plane; the first and second extension portions defining a first gap therebetween, the second and third extension portions defining a second gap therebetween, the first, second, and third extension portions having first, second, and third extension portion apertures, respectively, extending therethrough;

disposing the second side of the substantially circular-shaped base of the rotatable mounting bracket on the ring-shaped mounting portion of the plate member; and disposing a first member through the first and second apertures such that the substantially circular-shaped base is rotatably coupled to the ring-shaped mounting portion, the first member comprises a pin member, the pin member includes a tubular portion and a flange portion coupled to an end of the tubular portion; the tubular portion being disposed through the first and second apertures such that the flange portion contacts the second side of the plate member, and another end of the tubular portion being bent downwardly toward the first side of the substantially circular-shaped base.

16. The method of claim 15, wherein the first member comprises a pin member, the method further comprising:
providing a first washer and a second washer;
disposing the first washer and the second washer through a first end of the pin member such that the first washer contacts a top surface of the substantially circular-shaped base of the rotatable mounting bracket, and the second washer is disposed on the first washer; and
bending the first end of the pin member such that the first end of the pin member holds the first washer and the second washer between the first end of the pin member and the top surface of the substantially circular-shaped base of the rotatable mounting bracket.

17. The method of claim 16, further comprising:
providing a cushion member; and
coupling the cushion member to the second side of the plate member.

18. The method of claim 17, further comprising:
providing first and second straps;
coupling the first strap to the plate member proximate to a first end of the plate member; and
coupling the second strap to the plate member proximate to a second end of the plate member.

19. A hand-wearable camera harness, comprising:
a plate member having a first side and a second side disposed opposite to the first side, and a first aperture extending therethrough; the first aperture being centered about a first axis extending substantially perpendicular to the first side of the plate member; the first side of the plate member having a first surface and a ring-shaped mounting portion fixedly coupled to the first surface, the ring-shaped mounting portion extending outwardly from the first surface and further extending circumferentially around the first aperture, the ring-shaped mounting portion having a top surface with a first plurality of grooves extending therein, each groove of the first plurality of grooves extending from an outer portion of the ring-shaped mounting portion toward the first axis, each groove of the first plurality of grooves being disposed between two other grooves of the first plurality of grooves and spaced apart from the two other grooves of the first plurality of grooves;
a rotatable mounting bracket having a substantially circular-shaped base and at least first and second extension portions, the substantially circular-shaped base having a first side and a second side, and a second aperture extending through the substantially circular-shaped base from the first side of the substantially circular-shaped base to the second side of the substantially circular-shaped base, the second aperture being centered about the first axis; the second side of the substantially circular-shaped base having a bottom surface with a second plurality of grooves extending therein, each groove of the second plurality of grooves extending from an outer portion of the substantially circular-shaped base toward the first axis, each groove of the second plurality of grooves being disposed between two other grooves of the second plurality of grooves and spaced apart from the two other grooves of the second plurality of grooves; the first and second extension portions being fixedly coupled to the substantially circular-shaped base and extending substantially perpendicular to the first side thereof, such that a first plane extending through the first axis bisects the second extension portion and the second aperture, and the second extension portion being disposed a first distance away from a periphery of the second aperture in the first plane, the first and second extension portions defining a first gap therebetween; and
the second side of the substantially circular-shaped base of the rotatable mounting bracket being disposed on the ring-shaped mounting portion of the plate member, the substantially circular-shaped base being rotatably coupled to the ring-shaped mounting portion utilizing a first member extending through the first and second apertures; and
the first member comprises a pin member, the pin member includes a tubular portion and a flange portion coupled to an end of the tubular portion; the tubular portion being disposed through the first and second apertures such that the flange portion contacts the second side of the plate member, and another end of the tubular portion being bent downwardly to contact a first washer being disposed on a second washer wherein the second washer is further disposed on a portion of the first side of the substantially circular-shaped base.

* * * * *